US010678699B2

(12) United States Patent
Agarwala et al.

(10) Patent No.: US 10,678,699 B2
(45) Date of Patent: Jun. 9, 2020

(54) CASCADING PRE-FILTER TO IMPROVE CACHING EFFICIENCY

(71) Applicant: Cisco Technology, Inc., San Jose, CA (US)

(72) Inventors: Sandip Agarwala, Cupertino, CA (US); Shravan Gaonkar, Gainesville, FL (US); Ujwala Prabhakar Tulshigiri, Campbell, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 11 days.

(21) Appl. No.: 16/046,757

(22) Filed: Jul. 26, 2018

(65) Prior Publication Data

US 2020/0034305 A1    Jan. 30, 2020

(51) Int. Cl.
*G06F 12/00* (2006.01)
*G06F 12/0888* (2016.01)

(52) U.S. Cl.
CPC .. *G06F 12/0888* (2013.01); *G06F 2212/1044* (2013.01)

(58) Field of Classification Search
CPC ............... G06F 12/0888; G06F 2212/1044
See application file for complete search history.

(56) References Cited

U.S. PATENT DOCUMENTS

| | | | |
|---|---|---|---|
| 6,691,101 B2 | 2/2004 | MacNicol et al. | |
| 7,480,672 B2 | 1/2009 | Hahn et al. | |
| 8,086,755 B2 | 12/2011 | Duffy, IV et al. | |
| 8,713,405 B2 | 4/2014 | Healey, Jr. et al. | |
| 8,812,651 B1 * | 8/2014 | Eriksen | H04L 45/745 709/224 |
| 8,990,335 B2 | 3/2015 | Fauser et al. | |
| 9,003,159 B2 | 4/2015 | Deshkar et al. | |
| 9,229,810 B2 | 1/2016 | He et al. | |
| 9,244,761 B2 | 1/2016 | Yekhanin et al. | |
| 9,244,776 B2 | 1/2016 | Koza et al. | |
| 9,361,192 B2 | 6/2016 | Smith et al. | |
| 9,374,270 B2 | 6/2016 | Nakil et al. | |
| 9,479,556 B2 | 10/2016 | Voss et al. | |
| 9,483,337 B2 | 11/2016 | Gladwin et al. | |
| 9,558,078 B2 | 1/2017 | Farlee et al. | |
| 9,613,078 B2 | 4/2017 | Vermeulen et al. | |
| 2002/0103815 A1 | 8/2002 | Duvillier et al. | |
| 2003/0174725 A1 | 9/2003 | Shankar | |
| 2015/0142733 A1 | 5/2015 | Shadmon | |
| 2015/0222444 A1 | 8/2015 | Sarkar | |
| 2015/0302058 A1 | 10/2015 | Li et al. | |

(Continued)

OTHER PUBLICATIONS

Astakhov et al., "Lambda Architecture for Batch and RealTime Processing on AWS with Spark Streaming and Spark SQL," Amazon Web Services (AWS), May 2015, pp. 1-12.

*Primary Examiner* — Arvind Talukdar
(74) *Attorney, Agent, or Firm* — Polsinelli PC

(57) ABSTRACT

Aspects of the subject technology relate to a system configured to receive a request for data associated with a key, identify the key in a first pre-filter in a set of cascading pre-filters for the cache memory, wherein the set of cascading pre-filters is arranged in an order, and store, in response to the key being in the first pre-filter, the key in a second pre-filter in the set of cascading pre-filters, wherein the second pre-filter is next in the order after the first pre-filter.

20 Claims, 7 Drawing Sheets

(56) References Cited

U.S. PATENT DOCUMENTS

| | | |
|---|---|---|
| 2016/0119159 A1 | 4/2016 | Zhao et al. |
| 2016/0335361 A1 | 11/2016 | Teodorescu et al. |
| 2017/0053132 A1 | 2/2017 | Resch |
| 2018/0011852 A1* | 1/2018 | Bennett ............... G06F 16/9014 |
| 2019/0042304 A1* | 2/2019 | Wang .................. H04L 47/2441 |

* cited by examiner

CASCADING PRE-FILTER TO IMPROVE CACHING EFFICIENCY

TECHNICAL FIELD

The subject matter of this disclosure relates in general to the field of computer technology, and more specifically to efficiently caching data.

BACKGROUND

A storage tier is a collection of different types of storage media. Each storage media in the storage tier may have different characteristics that include speed, throughput, size, cost, performance, etc. Various forms of storage tiers are used across the field of computer technology to reduce total storage costs, improve performance, and/or as a requirement of performing certain tasks. The storage media found in a storage tier, depending on the type of storage tier, may include, for example, cache memory, random access memory, solid state drives, hard disk drives, tape drives, local memory, network or cloud storage (e.g., a web server).

Caching is used to store certain data so that subsequent requests for that data may be served faster or more efficiently. In particular, the data may be stored in a cache or cache memory, which may be implemented in hardware, software, or a combination. The cache memory is typically faster or more efficient to retrieve data from than other components in a storage tier. When a requestor (e.g., a cache client) requests data, it may first check the cache for the data. If the data is in the cache (a situation known as a cache hit), the data in the cache is retrieved and provided to the requestor. If the data is not in the cache (a situation known as a cache miss), the requestor retrieves the data from another storage media in the storage tier and stores the retrieved data in the cache for subsequent requests.

BRIEF DESCRIPTION OF THE FIGURES

In order to describe the manner in which the above-recited and other advantages and features of the disclosure can be obtained, a more particular description of the principles briefly described above will be rendered by reference to specific embodiments that are illustrated in the appended drawings. Understanding that these drawings depict only embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
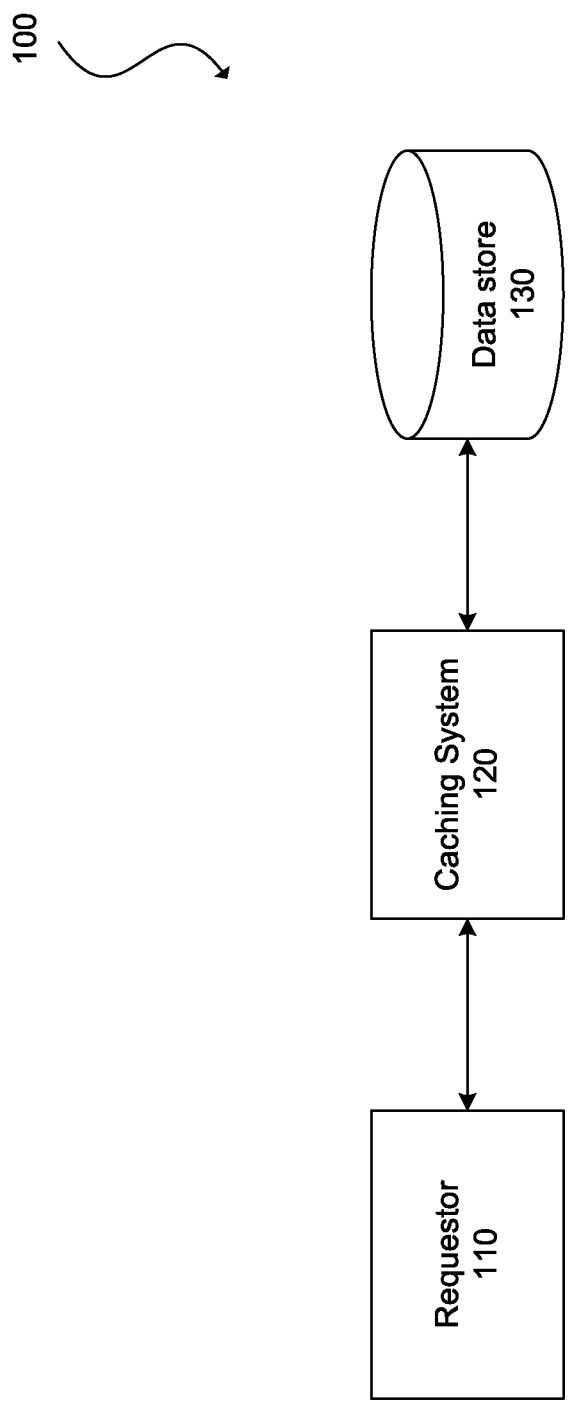
FIG. 1 is an illustration of an example computing environment where the caching system may operate, in accordance with various embodiments.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Aspects of the subject technology relate to a caching system configured to receive a request for data associated with a key, identify the key in a first pre-filter in a set of cascading pre-filters for the cache, wherein the set of cascading pre-filters is arranged in an order, and store, in response to the key being in the first pre-filter, the key in a second pre-filter in the set of cascading pre-filters, wherein the second pre-filter is next in the order after the first pre-filter.

Description

Various embodiments of the disclosure are discussed in detail below. While specific implementations are discussed, it should be understood that this is done for illustrative purposes only. A person skilled in the relevant art will recognize that other components and configurations may be used without departing from the spirit and scope of the disclosure.

A cache miss occurs when requested data is not found in the cache and must be retrieved from other storage media. Many caching strategies may involve automatically storing the data retrieved from the other storage media into the cache. Because the cache is often fixed in size, in order to store the retrieved data, other data must be evicted from the cache. Various cache replacement policies or eviction policies may be used including, for example, a least recently used (LRU) or least frequently used (LFU) policy. However, the eviction and replacement of data in the cache involves a great deal of computational resources, especially when done frequently.

In contrast to cache replacement or eviction strategies, various aspects of the subject technology relate to mechanisms for determining whether retrieved data should be stored in the cache upon a cache miss. A cache filtering policy may be implemented that prevents entries from being stored in the cache that may not be the best use of space in the cache. For example, upon the occurrence of a cache miss for data, a system may be configured to determine whether the data should be stored in cache memory (and other data be evicted as a result) using a pre-filter component to the cache. The system may determine whether data should be stored based on, for example, a frequency count. By being more discriminating in determining what data should be stored in the cache, the system is able to reduce the number of cache storage and eviction operations in certain situations, thus conserving computational resources.

FIG. 1 is an illustration of an example of a general computing environment 100 where the caching system may operate, in accordance with various embodiments. The computing environment 100 may include a requestor 110, a caching system 120, and a data store 130. It should be understood that, for the computing environment 100 and any environment discussed herein, may include additional or fewer components in similar or alternative configurations. The illustrations and examples provided herein are for clarity and simplicity.

The caching system 120 may exist in various types of environments that perform various functions. For example, the caching system 120 may be configured as a central processing unit (CPU) cache, a graphics processing unit (GPU) cache, a disk cache, a database cache, a web cache, or any other cache in situations where there is tiered storage that includes a collection of different types of storage media and where each storage media in the storage tier may have different characteristics that include speed, throughput, size, cost, performance, etc. The caching system 120 may include cache memory (e.g., the cache) for storing cached data and be configured to serve data from the cache, store data to the cache, and manage interactions between the caching system 120 and the requestor 110 and/or the data store 130. The cache may be a dedicated cache memory component, a faster or more efficient media of a storage tier, or another component of storage configured for caching data. For example, a cache could be implemented on a faster solid state drive or non-volatile memory (NVM) for speeding upon accesses to data stored on a slower hard disk drive.

Accordingly, a requestor 110 may be any system or entity requesting data from the caching system 120 and/or the data store 130. For example, the requestor 110 may be CPU, GPU, a hard disk or disk controller, a database application, a network device, a web browser, or other entity requesting data. The data store 130 may include a hard disk drive, a solid state drive, random access memory, a database, a server, or any other storage unit for data. The components of FIG. 1 may be implemented in hardware, software, or a combination.

Figure 2:
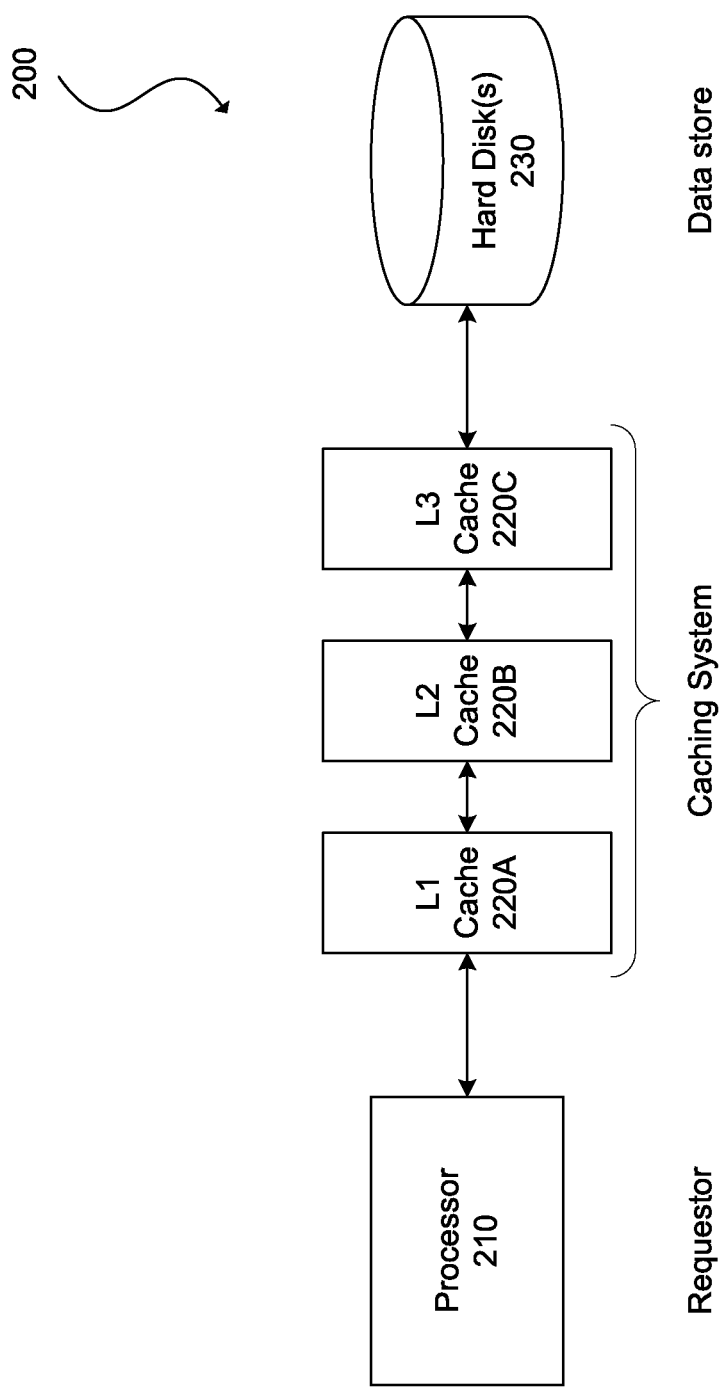
FIG. 2 is an illustration of an example of a computer system environment where the caching system may operate, in accordance with various embodiments.

FIG. 2 is an illustration of an example of a computer system environment 200 where the caching system may operate, in accordance with various embodiments. The computer system environment 200 may include a processor 210 as a requestor of data, one or more levels of cache 220A, 220B, 220C as a cache memory system, and one or more hard disks 230 or other storage drives as a data store.

Figure 3:
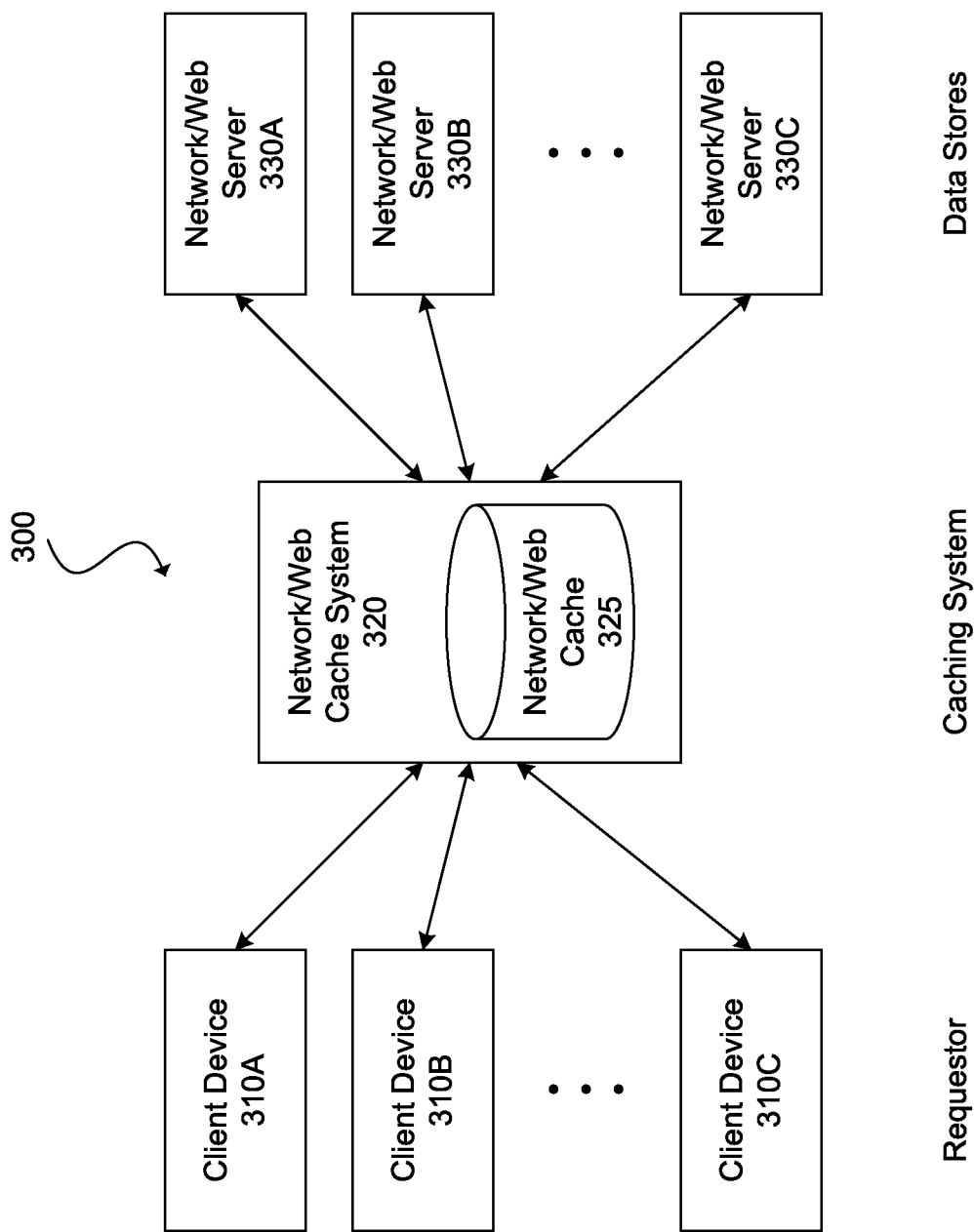
FIG. 3 is an illustration of an example of a network environment where the caching system may operate, in accordance with various embodiments.

FIG. 3 is an illustration of an example of a network environment 300 where the caching system may operate, in accordance with various embodiments. The network environment 300 may include one or more client devices 310A, 310B, and 310C as a requestor of data. A network or web cache system 320 may operate the caching system and include a network or web cache 325 for storing cached data. One or more network or web servers 330A, 330B, and 330C may represent a data store.

During operation, when a requestor requests data from a caching system or another system that includes or is in communication with the caching system, the caching system may first check the cache for the data. If the data is in the cache (a situation known as a cache hit), the data in the cache is retrieved and provided to the requestor. If the data is not in the cache (a situation known as a cache miss), the requestor retrieves the data from the data store. Instead of storing all data retrieved from the data store into the cache each time the data is retrieved from the data store, the caching system may select data to store in the cache based on a cache filtering policy.

A cache filtering policy may be implemented that prevents entries from being stored in cache memory that may not be the best use of space in the cache. The cache filtering policy may take into consideration one or more conditions and or factors when determining whether data should be written to the cache. For example, upon the occurrence of a cache miss for data, the caching system may determine whether data should be stored based on, for example, a frequency count. In other words, data may be stored in the cache if it has been requested a certain number of times. By being more discriminating in determining what data should be stored in the cache, the system is able to reduce the number of cache storage and eviction operations in certain situations, thus conserving computational resources.

According to some embodiments, the caching system may include one or more pre-filter components that may be used to determine whether the data should be stored in the cache (and other data be evicted as a result) using a pre-filter component to the cache.

Figure 4:
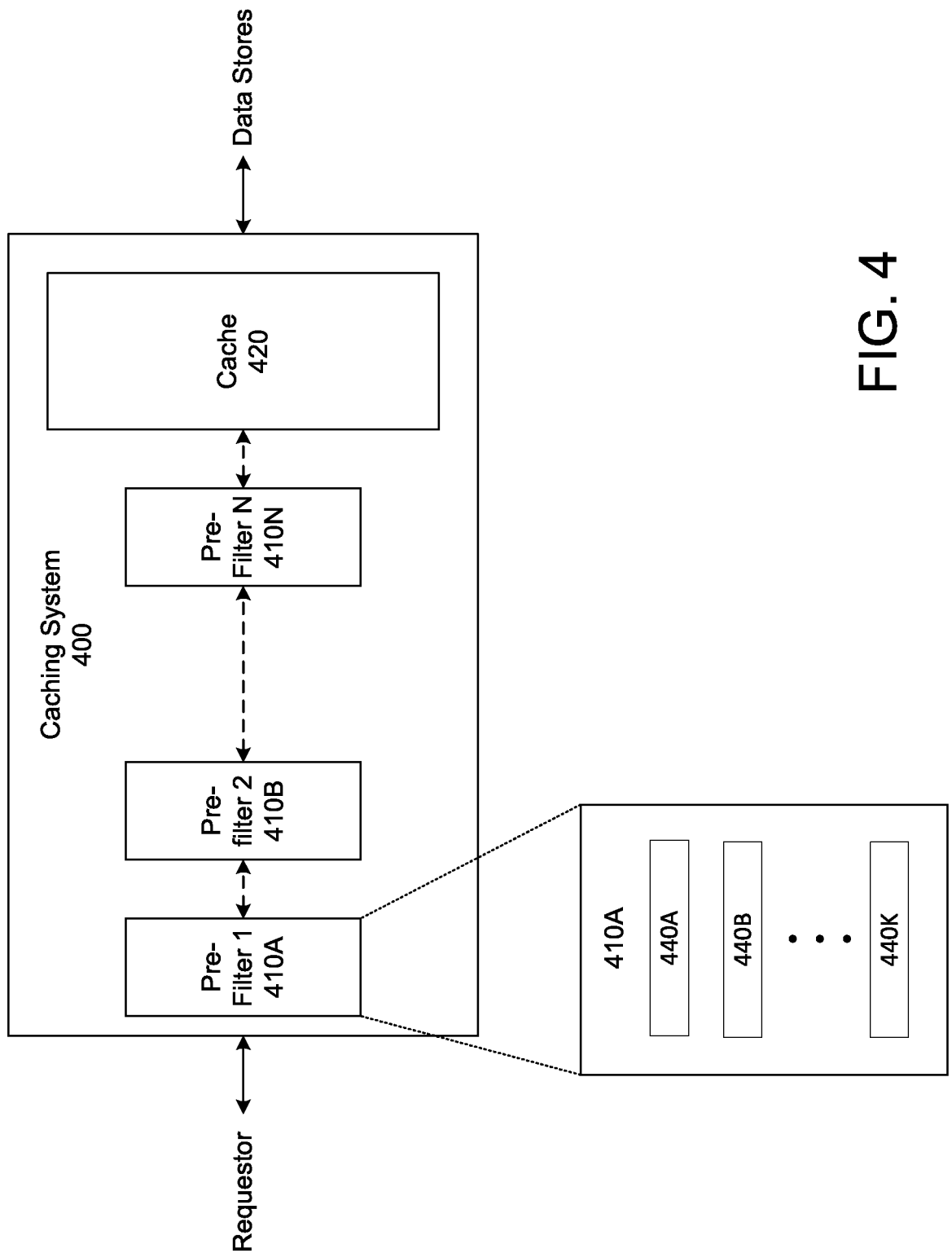
FIG. 4 is an illustration of an example caching system, in accordance with various embodiments.

FIG. 4 is an illustration of an example caching system 400, in accordance with various embodiments. The caching system 400 may include a set of cascading pre-filters 410A-410N and a cache 420. The set of cascading pre-filters 410A-410N is configured to help the caching system 400 keep track of the frequency or count of requests for data. For example, each pre-filter in the set of pre-filters 410A-410N may correspond to a particular count.

If the a cache filtering policy specifies that a particular item of data is to be requested N times before the item is data is stored in the cache 420, the caching system 400 is configured to use a set of N pre-filters to keep track of the count. The set of N pre-filters may be dynamically generated, selected from a larger set of pre-filters, or a static number of existing pre-filters. The set of N pre-filters may be organized into levels, a ranking, an order, or otherwise correspond to a count of requests for items stored in each pre-filter. For example, one pre-filter may correspond to a first count of a request of a particular item of data, a second pre-filter may correspond to a second count of a request for the item of data, and so on until the Nth pre-filter. Accordingly, the caching system 400 may be able to determine that there have been some number of previous requests for an item by searching the set of pre-filters for an entry for or record of the item of data (e.g., a key for the data). If an entry or record is found in a particular pre-filter corresponding to a count, that indicates that there have been at least that many requests for the item of data.

Each pre-filter may contain an entry or record for items of data recently requested. According to some embodiments, the entry or record may include a key for the item of data rather than the data itself. The key may be a uniform resource locator (URL), a physical address, a logical address, or other identifier for the item of data. In another embodiment, the key may be a hash of a uniform resource locator (URL), a physical address, a logical address, or other identifier for the item of data generated using a hash function such as (SHA, SHA2, MD5, etc.). The key may also be a hash of the contents of the item of data.

Each pre-filter may be limited in size and, as a result, only keep a certain number of entries or records for the most recently requested items of data. Entries or records for items of data requested further in the past may be evicted in order to store entries for items of data requested more recently. In an illustrative example, the caching system 400 may locate an entry for a particular item of content in pre-filter 2 410B by finding a hash of an identifier for the item of content in pre-filter 2 410B. The presence of an entry for the item of content in pre-filter 2 410B indicates that there have been at least 2 requests received for the item of content. Furthermore, since pre-filter 2 410B is of limited size, the 2 requests for the item of content must have been received within the recent past (e.g., within the maximum number of requests for content items that may be tracked by the limited entries of pre-filter 2 410B).

The pre-filters may be implemented in various different forms and use various data structures. However, in order to achieve additional technological improvements in reducing the space needed to store entries and allow for quicker searching, the set of N cascading pre-filters may be implemented as bloom filters. A bloom filter is a space efficient and fast data structure that enables a quick determination of whether an element (e.g., an entry or record) is in the set or not. However, the "if-exists" determination is probabilistic, meaning that the bloom filter may reveal that an item is definitely not in the set or may be in the set (e.g., there may be false positives). The false positive rate is a function of the bloom filter's size and the number and independence of the hash functions used. Additionally, a bloom filter does not allow for deletion of entries or records. Instead, a bloom filter can only be emptied and reset. It would hinder the ability of a pre-filter to keep track of requests if all entries would need to be deleted when the bloom filter becomes full and needs to be reset.

In order to mitigate these technical shortcomings and take advantage of the technical advantages of bloom filters, in some embodiments, each pre filter in the set of N cascading pre-filters may be implemented as a set of K bloom filters 440A-440K, as seen in FIG. 4. For example, by having more bloom filters of smaller size, the false positive rate of the bloom filters performance are reduced. Furthermore, by having more bloom filters of smaller size, not all bloom filters need to be reset when storage is full. As will be described in greater detail below, a subset of the bloom filters may be reset and used to store new entries.

Figure 5:
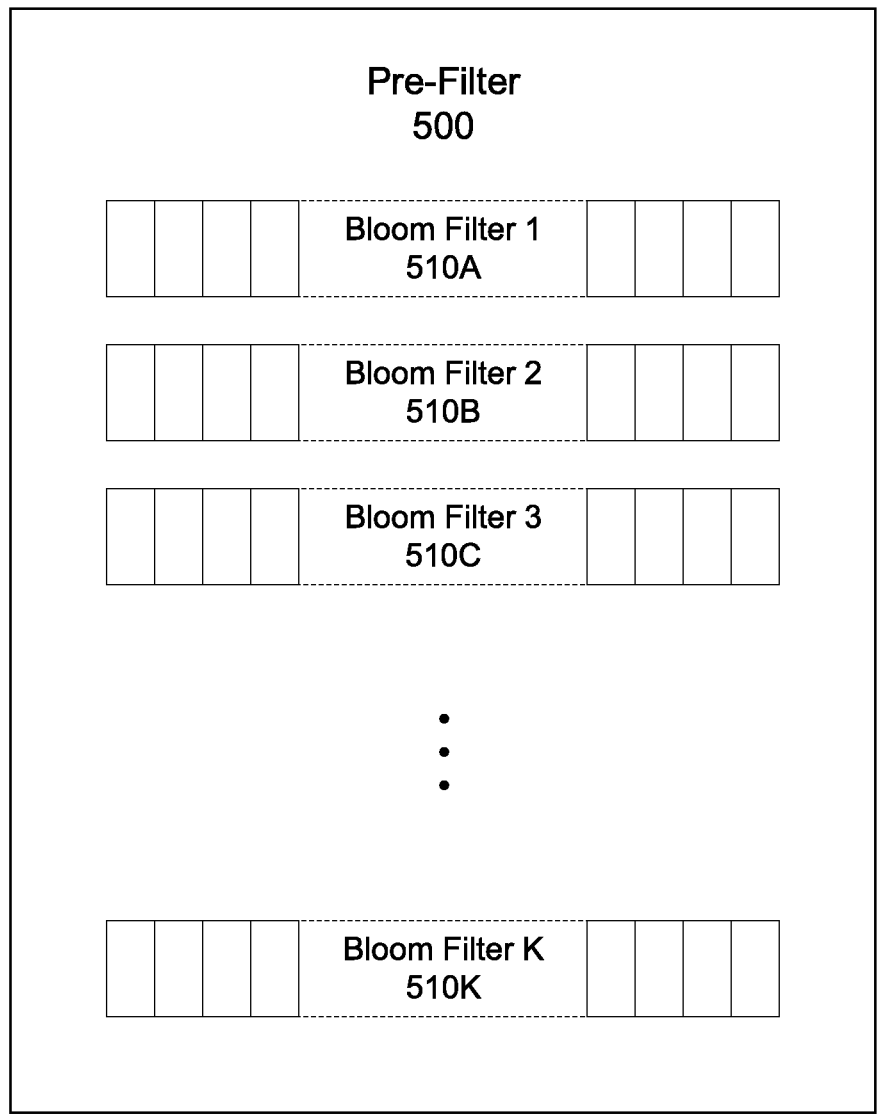
FIG. 5 is an illustration of an example pre-filter, in accordance with various embodiments.

FIG. 5 provides a further illustration of an example pre-filter 500, in accordance with various embodiments. Pre-filter 500 includes K bloom filters 510A-510K. Each of the K bloom filters is configured to store a specified number of entries (e.g., 1000). The K bloom filters 510A-510K are ordered such that as the pre-filter 500 stores a record of requests for data, the records of the request are stored sequentially from a first bloom filter (e.g., bloom filter 510A) until the first bloom filter is full and then a next bloom filter (e.g., bloom filter 510B) until the next bloom filter is full until the last bloom filter (e.g., bloom filter 510K) is full.

Once the set of K bloom filters 510A-510K is full and a new record of a request is to be stored, not all of the K bloom filters 510A-510K need to be reset. For example, the first bloom filter (e.g., bloom filter 510A) may be reset and emptied while the remaining bloom filters (e.g., bloom filters 510B-510K) may remain full and enable the tracking of requests for data corresponding to their stored records. To illustrate, if there are K=10 bloom filters storing records of requests for data, only one of the bloom filters may be reset. Accordingly, 9/10ths of the records are still stored.

After the first bloom filter (e.g., bloom filter 510A) is reset, new records of requests for data may be stored in the first bloom filter (e.g., bloom filter 510A) until the first bloom filter (e.g., bloom filter 510A) is full. Then the second bloom filter (e.g., bloom filter 510B) in the sequential order of K bloom filters 510A-510K is reset and new records of requests for data may be stored in the second bloom filter (e.g., bloom filter 510B) until the second bloom filter (e.g., bloom filter 510B) is full. This process continues as new records of requests for data need to be stored. One of the sequential order of K bloom filters 510A-510K is reset and new records of requests for data are stored in that bloom filter until it is full. Then the next bloom filter is rest and used to store records of requests for data and so on. Accordingly, each pre-filter is able to accommodate and track of the most recent requests to store entries or records in the pre-filter.

Figure 6:
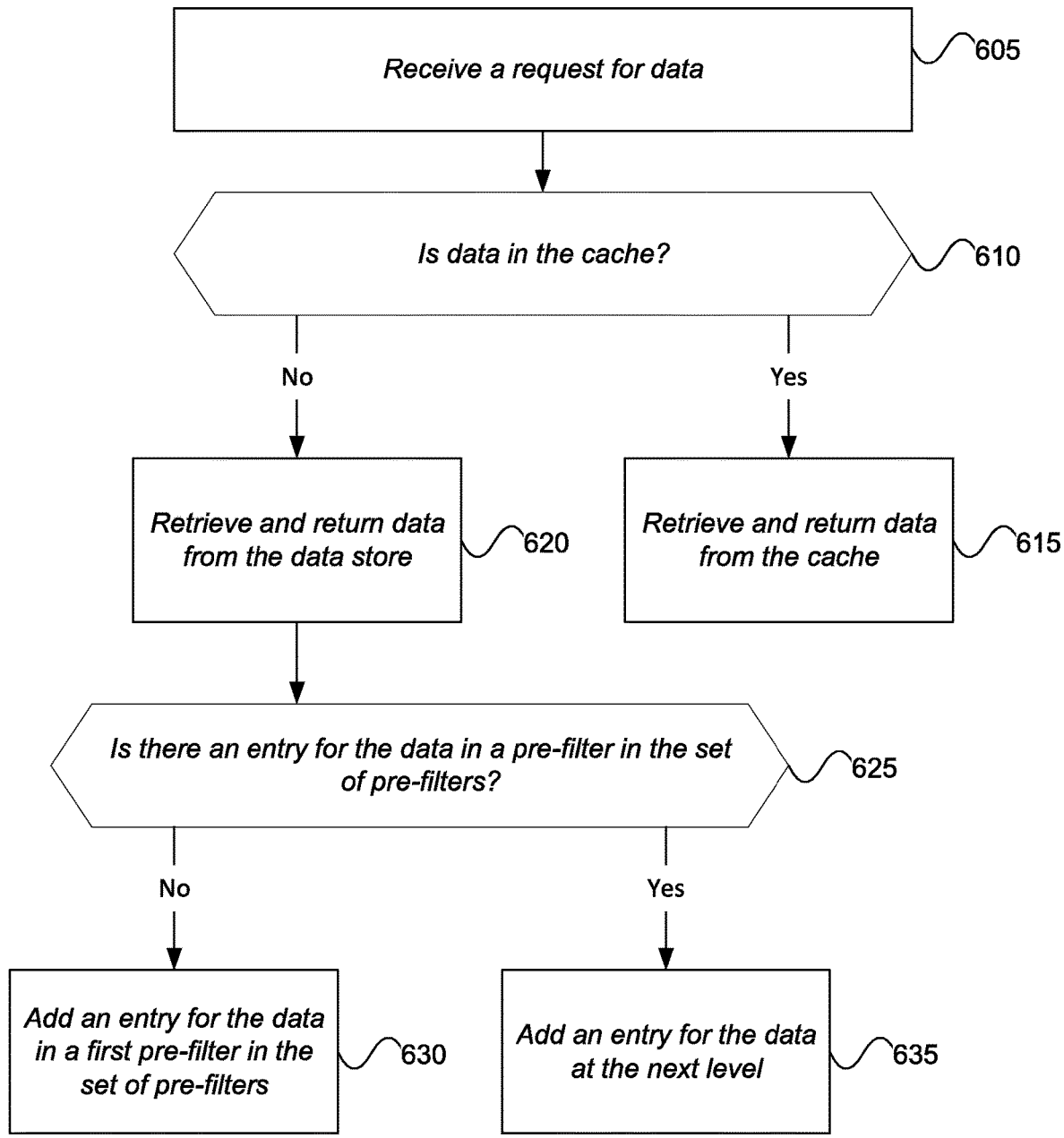
FIG. 6 illustrates an example of a process for using a set of cascading pre-filters for the cache, in accordance with an embodiment.

FIG. 6 illustrates an example of a process 600 for using a set of cascading pre-filters for a cache, in accordance with an embodiment. It should be understood that, for any process discussed herein, there can be additional, fewer, or alternative steps performed in similar or alternative orders, or in parallel, within the scope of the various embodiments unless otherwise stated. The process 600 can be performed by a computing system or component, and particularly, a caching system (e.g., the caching system 120 of FIG. 1.) or similar system.

At operation 605, the caching system may receive a request for data from a requestor. The request may include an identifier for the data (e.g., a uniform resource locator (URL), a physical address, a logical address, reference number or label, etc.) or a hash of the identifier. The caching system may then determine whether the requested data is in the cache at operation 610 based on the identifier or the hash of the identifier. If the requested data is in the cache, the caching system may retrieve the data and provide the data to the requestor at operation 615. In some embodiments, the caching system may also update the pre-filters based on the received request for data.

If the requested data is not in the cache, the caching system may retrieve the data from the data store (e.g., a hard disk, cloud storage, web server, etc.) and provide the data to the requestor at operation 620. The caching system may also update the pre-filters based on the received request for data. For example, at operation 625, the caching system determines whether there is an entry for the requested data in one or more of the pre-filters based on the data identifier or a hash of the identifier. In other embodiments, the caching system may generate the hash of the identifier based on a hashing function. According to some embodiments, the caching system may check every pre-filter in the set of pre-filters to determine whether there is an entry for the requested data. In other embodiments, the caching system may check from the highest pre-filter to the lowest (e.g., first) pre-filter and stop when an entry for the requested data is found.

Each pre-filter in the set of cascading pre-filters may correspond to a count of a number of times that data has been received. Accordingly, not finding an entry for the requested data in any of the pre-filters indicates that the caching system is not aware of a previous request for that data and the request received at operation 605 is the first request received for that data. Accordingly, if no entry for the requested data is found in any of the pre-filters, at operation 630, the caching system may add an entry for the requested data in the first pre-filter in the set of pre-filters, where an entry in the first pre-filter indicates that a request for the corresponding data has been received once. The entry may include the identifier for the data or a hash of the identifier.

A found entry for the requested data in a pre-filter corresponding to a count indicates that the caching system is aware of the corresponding number of previous requests for that data. To store a record of the request for the data received at operation 605, the caching system is configured to add an entry for the data at the next level at operation 635. The next level may be the next pre-filter in the cascading set of pre-filters (e.g., the pre-filter with the next incremental count). For example, if an entry for the data is found in pre-filter Z, indicating that the caching system is aware of Z number of previous requests for the data and the caching system may add an entry for the data in pre-filter Z+1. As noted above, the pre-filters may include a set of ordered bloom filters. Accordingly, entries for the data may be added in sequence in one of the bloom filters of the appropriate pre-filter.

If the pre-filter is the highest pre-filter in the set of cascading pre-filters (e.g., pre-filter N), it indicates that, according to the caching system, the requisite number of previous requests for the data as prescribed by the cache filtering policy have been received and the data is permitted by the cache filtering policy to be stored in the cache. Accordingly, the next level of the highest pre-filter is the cache. The entry stored in the cache may include the data itself along with a key (e.g., a data identifier or a hash of the data identifier).

Because the cache is often fixed in size, in some cases, data must be evicted from the cache before the caching system may store the data requested at operation 605. Data may be evicted from the cache in accordance with a cache replacement policy or cache eviction policy. According to various embodiments, the caching system may utilize the set of cascading pre-filters to implement a cache replacement policy or cache eviction policy.

For example, as noted above, the set of cascading pre-filters is configured to help the caching system keep track of the frequency or count of requests for data. For example, each pre-filter in the set of pre-filters may correspond to a particular count. As a result, the set of cascading pre-filters may be used by the caching system to use a number of previous requests for data (that the caching system is aware of) in a cache replacement policy or cache eviction policy.

Each pre-filter may also be implemented as an ordered set of bloom filters. Accordingly, for each count or a request for data corresponding to a particular pre-filter, the pre-filter may be able to track a relative recency of requests for data. For example, if entries for two items of data are found in the same pre-filter, this may indicate that both items of data have been requested the same number of times (e.g., corresponding to the count of the pre-filter). Accordingly, the caching system may determine which of the two items of data was requested more recently by looking at the position of each entry in the bloom filters of the pre-filter. In some cases, the item of data that was requested more recently is kept while the other is evicted.

Various embodiments of the subject technology relate to a caching system configured to evict entries in a cache. For example, when eviction of an entry is called for (e.g., when space in the cache is needed to store a new entry), the caching system may identify the keys for all items of data (or a set of items that are candidates for eviction) in the cache. For each key, the caching system may check the set of pre-filters for the key. If a key is not in any of the pre-filters, it may be evicted. However, if all keys are found in the pre-filters, the caching system may check with pre-filter each key is found in and rank the keys. The keys found in higher pre-filters correspond to items of data that have been requested more times, according to the caching system. As a result, the key found in the lowest pre-filter may be evicted. If more than one key is found in the lowest pre-filter, the caching system may determine which of the keys corresponds to a least recent request by looking at the position of each of the keys in the bloom filters of the pre-filter. The caching system may identify the least recent key and evict the entry in the cache associated with that key.

Figure 7A:
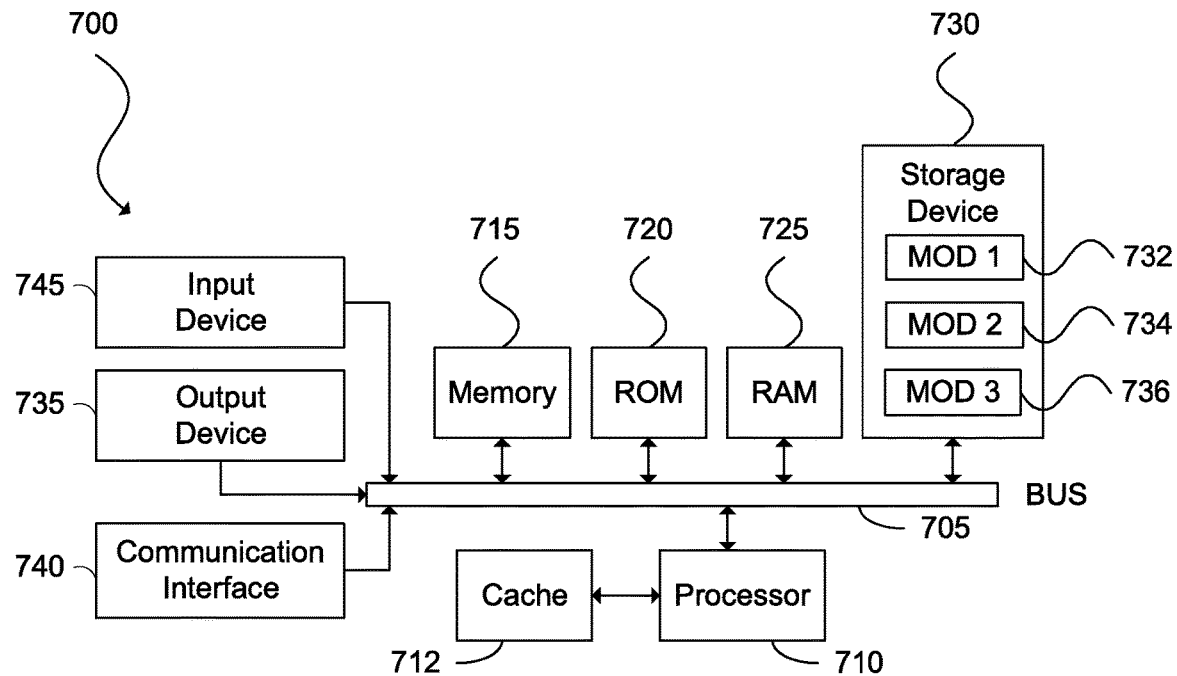
FIGS. 7A and 7B illustrate examples of systems in accordance with some embodiments.
Figure 7B:
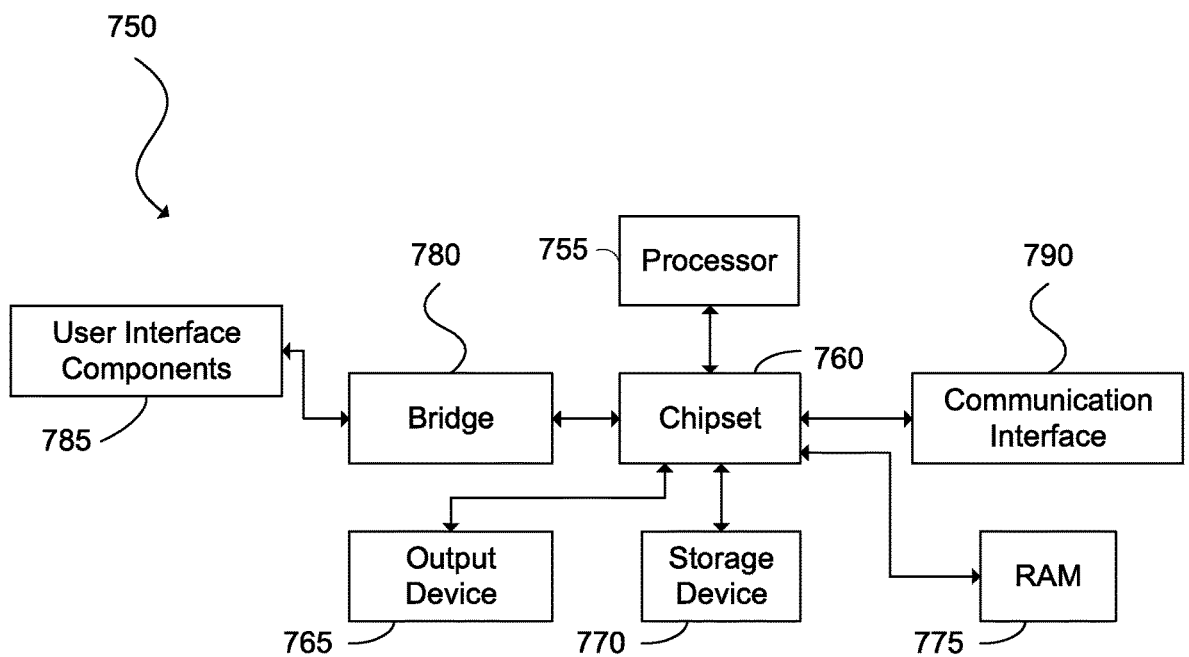

FIG. 7A and FIG. 7B illustrate systems in accordance with various embodiments. The more appropriate system will be apparent to those of ordinary skill in the art when practicing the various embodiments. Persons of ordinary skill in the art will also readily appreciate that other systems are possible.

FIG. 7A illustrates an example architecture for a bus computing system 700 wherein the components of the system are in electrical communication with each other using a bus 705. The computing system 700 can include a processing unit (CPU or processor) 710 and a system bus 705 that may couple various system components including the system memory 715, such as read only memory (ROM) in a storage device 770 and random access memory (RAM) 775, to the processor 710. The computing system 700 can include a cache 712 of high-speed memory connected directly with, in close proximity to, or integrated as part of the processor 710. The computing system 700 can copy data from the memory 715 and/or the storage device 730 to the cache 712 for quick access by the processor 710. In this way, the cache 712 can provide a performance boost that avoids processor delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 may essentially be a completely self-contained computing system, containing multiple cores or processors, a bus, memory controller, cache, etc. A multi-core processor may be symmetric or asymmetric.

To enable user interaction with the computing system 700, an input device 745 can represent any number of input mechanisms, such as a microphone for speech, a touch-protected screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing system 700. The communications interface 740 can govern and manage the user input and system output. There may be no restriction on operating on any particular hardware arrangement and therefore the basic features here may easily be substituted for improved hardware or firmware arrangements as they are developed.

Storage device 730 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, output device 735, and so forth, to carry out the function.

FIG. 7B illustrates an example architecture for a chipset computing system 750 that can be used in accordance with an embodiment. The computing system 750 can include a processor 755, representative of any number of physically and/or logically distinct resources capable of executing software, firmware, and hardware configured to perform identified computations. The processor 755 can communicate with a chipset 760 that can control input to and output from the processor 755. In this example, the chipset 760 can output information to an output device 765, such as a display, and can read and write information to storage device 770, which can include magnetic media, and solid state media, for example. The chipset 760 can also read data from and write data to RAM 775. A bridge 780 for interfacing with a variety of user interface components 785 can be provided for interfacing with the chipset 760. The user interface components 785 can include a keyboard, a microphone, touch detection and processing circuitry, a pointing device, such as a mouse, and so on. Inputs to the computing system 750 can come from any of a variety of sources, machine generated and/or human generated.

The chipset 760 can also interface with one or more communication interfaces 790 that can have different physical interfaces. The communication interfaces 790 can include interfaces for wired and wireless LANs, for broadband wireless networks, as well as personal area networks. Some applications of the methods for generating, displaying, and using the GUI disclosed herein can include receiving ordered datasets over the physical interface or be generated by the machine itself by processor 755 analyzing data stored in the storage device 770 or the RAM 775. Further, the computing system 700 can receive inputs from a user via the user interface components 785 and execute appropriate functions, such as browsing functions by interpreting these inputs using the processor 755.

It will be appreciated that computing systems 700 and 750 can have more than one processor 710 and 755, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware, and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
   receiving, from a requestor, a request for data associated with a key;
   determining that the data is not in a cache;
   identifying the key in a first pre-filter in a set of cascading pre-filters associated with the cache, wherein subsequent pre-filters in the set of cascading pre-filters correspond to greater request frequency counts than previous pre-filters in the set of cascading pre-filters; and
   storing, in response to the key being in the first pre-filter, the key in a second pre-filter in the set of cascading pre-filters, wherein a second request frequency count, that corresponds to the second pre-filter, is greater than a first request frequency count, that corresponds to the first pre-filter.

2. The computer-implemented method of claim 1, further comprising determining the key for the data by performing a hash function on an identifier of the data.

3. The computer-implemented method of claim 2, wherein the identifier of the data is at least one of a uniform resource locator (URL) of the data, a logical address for the data, or a physical address for the data.

4. The computer-implemented method of claim 1, wherein each pre-filter in the set of cascading pre-filters comprises an ordered set of bloom filters.

5. The computer-implemented method of claim 4, further comprising:
   determining that each bloom filter in the ordered set of bloom filters for the second pre-filter is full;

resetting a first bloom filter in the ordered set of bloom filters for the second pre-filter; and storing the key in the first bloom filter.

6. The computer-implemented method of claim 1, further comprising:

receiving a second request for the data;

identifying the key in the second pre-filter in the set of cascading pre-filters, wherein the second pre-filter is a final pre-filter in the set of cascading pre-filters; and storing, in response to the key being in the second pre-filter, the data in a first entry in the cache.

7. The computer-implemented method of claim 6, further comprising evicting a second entry in the cache based on a location of a corresponding entry in at least one pre-filter in the set of cascading pre-filters.

8. The computer-implemented method of claim 1, further comprising:

determining that the key is not in any pre-filter in the set of cascading pre-filters; and storing the key in a pre-filter, in the set of cascading pre-filters, that corresponds to a request frequency count of 1.

9. The computer-implemented method of claim 1, wherein the requestor is a client device and the request for data is received over a network.

10. The computer-implemented method of claim 1, wherein the requestor is a processor.

11. The computer-implemented method of claim 1, further comprising;

retrieving the data from a data store; and providing the data to the requestor.

12. The computer-implemented method of claim 11, wherein the data store is a network server.

13. A non-transitory computer-readable medium having computer readable instructions that, upon being executed by a processor, cause the processor to:

receive a request for data associated with a key, wherein the data is not in a cache;

identify the key in a first pre-filter in a set of cascading pre-filters associated with the cache, wherein subsequent pre-filters in the set of cascading pre-filters correspond to greater request frequency counts than previous pre-filters in the set of cascading pre-filters; and store, in response to the key being in the first pre-filter, the key in a second pre-filter in the set of cascading pre-filters, wherein a second request frequency count, that corresponds to the second pre-filter, is greater than a first request frequency count, that corresponds to the first pre-filter.

14. The non-transitory computer-readable medium of claim 13, wherein the instructions further cause the processor to:

receive a second request for the data;

identify the key in the second pre-filter in the set of cascading pre-filters, wherein the second pre-filter is a final pre-filter in the set of cascading pre-filters; and store, in response to the key being in the second pre-filter, the data in a first entry in the cache.

15. A system comprising:

a processor;

a cache memory;

a set of cascading pre-filters associated with the cache memory, wherein subsequent pre-filters in the set of cascading pre-filters correspond to greater request frequency counts than previous pre-filters in the set of cascading pre-filters; and operational memory including instructions that, upon being executed by the processor, cause the system to:

receive, from a requestor, a request for data associated with a key, wherein the data is not in the cache memory;

identify the key in a first pre-filter in the set of cascading pre-filters; and store, in response to the key being in the first pre-filter, the key in a second pre-filter in the set of cascading pre-filters, wherein a second request frequency count, that corresponds to the second pre-filter, is greater than a first request frequency count, that corresponds to the first pre-filter.

16. The system of claim 15, wherein each pre-filter in the set of cascading pre-filters comprises an ordered set of bloom filters.

17. The system of claim 15, wherein the operational memory comprises further instructions that, upon being executed by the processor, further cause the system to:

retrieve the data from a data store; and provide the data to the requestor.

18. The system of claim 17, wherein the data store is a network server and the requestor is a client device.

19. The system of claim 16, wherein the operational memory comprises further instructions that, upon being executed by the processor, further cause the system to:

determine that each bloom filter in the ordered set of bloom filters for the second pre-filter is full;

reset a first bloom filter in the ordered set of bloom filters for the second pre-filter; and store the key in the first bloom filter.

20. The system of claim 15, wherein the operational memory comprises further instructions that, upon being executed by the processor, further cause the system to:

receive a second request for the data;

identify the key in the second pre-filter in the set of cascading pre-filters, wherein the second pre-filter is a final pre-filter in the set of cascading pre-filters;

store, in response to the key being in the second pre-filter, the data in a first entry in the cache memory; and evict a second entry in the cache memory based on a location of a corresponding entry in at least one pre-filter in the set of cascading pre-filters.

* * * * *